(12) United States Patent
Cottrell et al.

(10) Patent No.: US 10,631,705 B2
(45) Date of Patent: *Apr. 28, 2020

(54) HOUSEHOLD APPLIANCE HAVING ANTENNAS

(71) Applicant: WHIRLPOOL CORPORATION, Benton Harbor, MI (US)

(72) Inventors: Nicholas J. Cottrell, Berrien Springs, MI (US); Jason R. Gries, Southbend, IN (US); Vince A. Ireland, Saint Joseph, MI (US); Blayne C. Smith, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,718

(22) Filed: Apr. 22, 2019

(65) Prior Publication Data

US 2019/0239714 A1 Aug. 8, 2019

Related U.S. Application Data

(63) Continuation of application No. 15/980,122, filed on May 15, 2018, now Pat. No. 10,307,034, which is a
(Continued)

(51) Int. Cl.
*A47L 15/00* (2006.01)
*A47L 15/46* (2006.01)
(Continued)

(52) U.S. Cl.
CPC ....... *A47L 15/0063* (2013.01); *A47L 15/0018* (2013.01); *A47L 15/0084* (2013.01);
(Continued)

(58) Field of Classification Search
CPC .. A47L 15/0018; A47L 15/46; A47L 15/0084; A47L 15/4297; A47L 15/4293;
(Continued)

(56) References Cited

U.S. PATENT DOCUMENTS 6,456,242 B1 9/2002 Crawford
6,675,818 B1 1/2004 Schrott et al.
(Continued)

FOREIGN PATENT DOCUMENTS

| CN | 202853254 U | 4/2013 |
| CN | 103712406 A | 4/2014 |

(Continued)

OTHER PUBLICATIONS

German Search Report for Counterpart DE102013111614.0, dated Mar. 20, 2014.
(Continued)

*Primary Examiner* — Benjamin L Osterhout
(74) *Attorney, Agent, or Firm* — McGarry Bair PC

(57) ABSTRACT

A household appliance, such as a dishwasher, for treating an item, such as a dish, in a treating chamber according to at least one automatic cycle of operation includes multiple antennas for transmitting and receiving data with an external network. The multiple antennas can be coupled with a radio also located within the appliance.

20 Claims, 7 Drawing Sheets

Related U.S. Application Data continuation of application No. 15/352,031, filed on Nov. 15, 2016, now Pat. No. 10,004,376, which is a continuation of application No. 15/177,820, filed on Jun. 9, 2016, now Pat. No. 9,510,723, which is a continuation of application No. 13/721,990, filed on Dec. 20, 2012, now Pat. No. 9,375,125.

(51) Int. Cl.

| | | |
|---|---|---|
| *D06F 33/02* | (2006.01) | |
| *A47L 15/42* | (2006.01) | |
| *F25D 29/00* | (2006.01) | |
| *F25D 23/12* | (2006.01) | |
| *H04B 1/38* | (2015.01) | |

(52) U.S. Cl.
CPC ....... *A47L 15/0086* (2013.01); *A47L 15/4257* (2013.01); *A47L 15/4274* (2013.01); *A47L 15/4287* (2013.01); *A47L 15/4293* (2013.01); *A47L 15/4297* (2013.01); *A47L 15/46* (2013.01); *D06F 33/02* (2013.01); *F25D 23/12* (2013.01); *F25D 29/00* (2013.01); *D06F 2210/00* (2013.01); *F25B 2600/07* (2013.01); *F25D 2400/36* (2013.01); *H04B 1/38* (2013.01)

(58) Field of Classification Search
CPC ............. A47L 15/4287; A47L 15/4274; A47L 15/4257; A47L 15/0086; A47L 15/0063; D06F 33/02; D06F 2210/00; F25D 23/12; F25D 29/00; F25D 2400/36; H04B 1/38; F25B 2600/07
See application file for complete search history.

(56) References Cited

U.S. PATENT DOCUMENTS

| | | |
|---|---|---|
| 7,363,031 B1 | 4/2008 | Aisa |
| 7,383,644 B2 | 6/2008 | Lyu et al. |
| 7,445,013 B2 | 11/2008 | Vanderroest et al. |
| 7,523,758 B2 | 4/2009 | Vanderroest et al. |
| 9,375,125 B2 | 6/2016 | Cottrell et al. |
| 9,510,723 B2 | 12/2016 | Cottrell et al. |
| 2002/0122006 A1 | 9/2002 | Crawford |
| 2008/0186170 A1 | 8/2008 | Scheifer |
| 2009/0118848 A1 | 5/2009 | Santinato et al. |
| 2009/0298449 A1 | 12/2009 | Tylicki et al. |
| 2010/0132735 A1 | 6/2010 | Gaus et al. |
| 2010/0182136 A1 | 7/2010 | Pryor |
| 2011/0137657 A1 | 6/2011 | Cenedese et al. |
| 2011/0140972 A1 | 6/2011 | Besore et al. |
| 2011/0153101 A1 | 6/2011 | Thomas et al. |
| 2011/0153109 A1 | 6/2011 | Drake et al. |
| 2011/0202293 A1 | 8/2011 | Kobraei et al. |
| 2011/0222448 A1 | 9/2011 | Ofek et al. |
| 2011/0226808 A1 | 9/2011 | Lonski |
| 2012/0209446 A1 | 8/2012 | Poyner et al. |
| 2013/0066479 A1 | 3/2013 | Shetty et al. |
| 2013/0125937 A1 | 5/2013 | Baldwin et al. |
| 2013/0171023 A1 | 7/2013 | Ben-Shmuel et al. |
| 2013/0228202 A1 | 9/2013 | Welch et al. |
| 2014/0041695 A1 | 2/2014 | Ellingson et al. |
| 2014/0139381 A1 | 5/2014 | Sippel |

FOREIGN PATENT DOCUMENTS

| | | |
|---|---|---|
| EP | 2302122 A1 | 3/2011 |
| EP | 2339057 A1 | 6/2011 |
| EP | 2700346 A2 | 2/2014 |
| WO | 2013098330 A2 | 4/2013 |

OTHER PUBLICATIONS

Machine Translation of EP 2700346 to Aicher, Feb. 2014. (Year: 2017).

US 10,631,705 B2

HOUSEHOLD APPLIANCE HAVING ANTENNAS

CROSS REFERENCE TO RELATED APPLICATION(S)

This application is a continuation of U.S. patent application Ser. No. 15/980,122, filed May 15, 2018, now U.S. Pat. No. 10,307,034, issued Jun. 4, 2019, which is a continuation of U.S. patent application Ser. No. 15/352,031, filed Nov. 15, 2016, now U.S. Pat. No. 10,004,376, issued Jun. 26, 2018, which is a continuation of U.S. patent application Ser. No. 15/177,820, filed Jun. 9, 2016, now U.S. Pat. No. 9,510,723, issued Dec. 6, 2016, which is a continuation of U.S. patent application Ser. No. 13/721,990, filed Dec. 20, 2012, now U.S. Pat. No. 9,375,125, issued Jun. 28, 2016, all of which are incorporated herein by reference in their entirety.

BACKGROUND

Dishwashers include a treating chamber in which dishes are placed to be washed according to an automatic cycle of operation. Users are increasingly interested in remote communication with home appliances, including dishwashers, in order to efficiently manage usage of the appliance. It is known to provide a dishwasher with an antenna to facilitate remote communication. Providing a dishwasher with an antenna is challenging because most dishwashers are primarily constructed of metal that is electrically connected to earth ground, which acts as a large Faraday shield and does not allow wireless signals to escape the dishwasher. Previous solutions have included mounting an antenna away from the dishwasher, or mounting an antenna on one of the outside surfaces of the dishwasher.

BRIEF DESCRIPTION

The present disclosure relates to a dishwasher, including a housing having a front and a rear, a tub located within the housing and at least partially defining a treating chamber configured for receiving items for treatment according to at least one automatic cycle of operation, at least one controllable component configured to implement the at least one automatic cycle of operation, a controller coupled to the at least one controllable component and configured to control the at least one controllable component according to the at least one automatic cycle of operation, and a radio system in communication with the controller for transmitting and receiving data and having a set of antennas configured for providing collective coverage for external communication and wherein at least one of the set of antennas is located proximate a lower portion of the housing.

DETAILED DESCRIPTION

Figure 1:
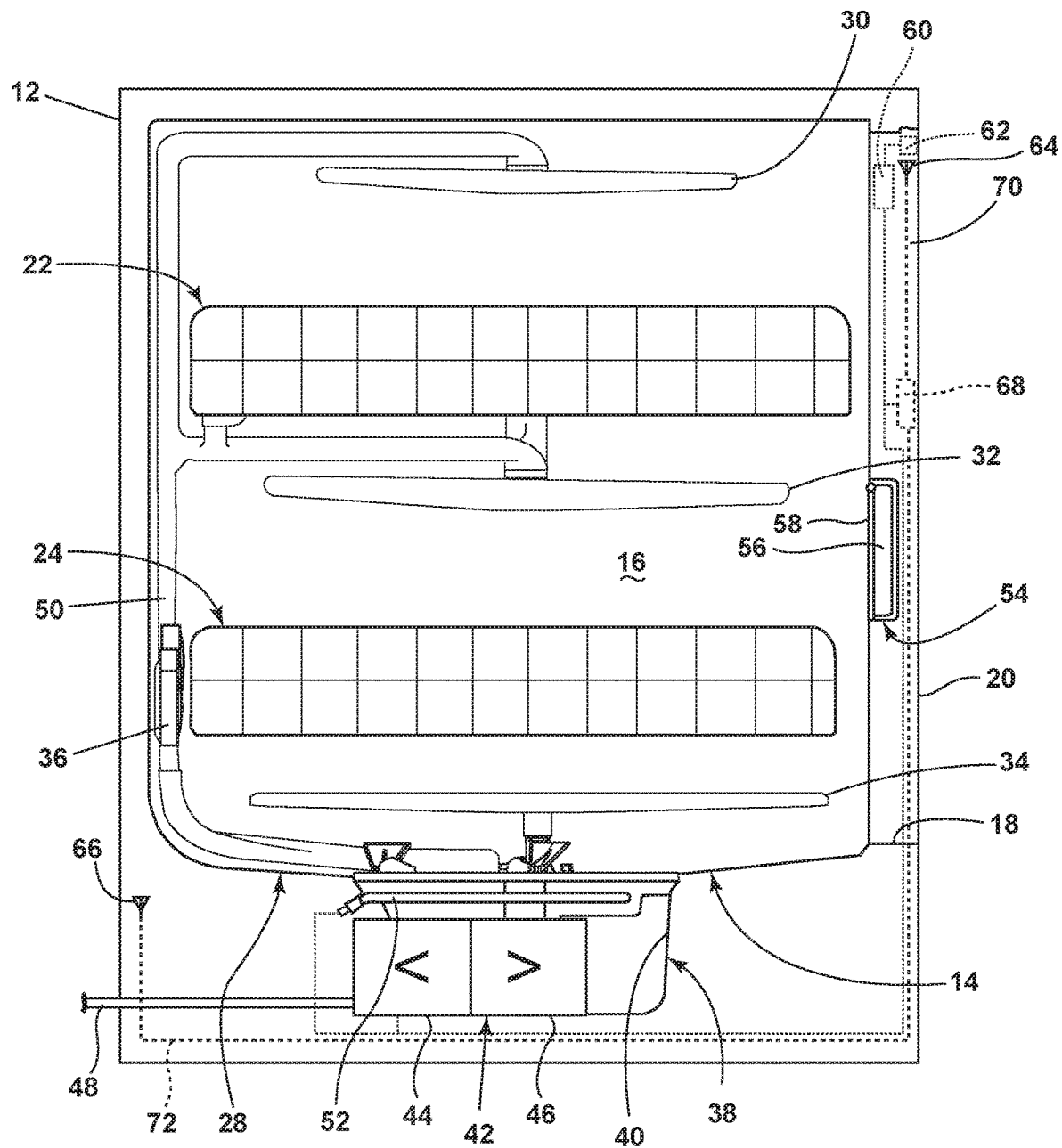
FIG. 1 is a schematic illustration of an automatic dishwasher according to an aspect of the present disclosure.

In FIG. 1, an automated dishwasher 10 according to an aspect of the present disclosure is schematically illustrated. The dishwasher 10 shares many features of a conventional automated dishwasher. The dishwasher 10 has a housing, which may include a cabinet or chassis 12 that may define an interior of the dishwasher 10. The dishwasher housing may also include a frame (not shown), with or without panels mounted to the frame. An open-faced tub 14 may be mounted to the dishwasher housing and provided within the chassis 12, and may at least partially define a treating chamber 16, having an open face 18 defining an access opening, for washing dishes. A door assembly 20 may be movably mounted to the dishwasher 10 for movement between opened and closed positions to selectively open and close the open face 18 of the tub 14. Thus, the door assembly 20 provides accessibility to the treating chamber 16 for the loading and unloading of dishes or other washable items. When the door assembly 20 is closed, user access to the treating chamber 16 may be prevented, whereas user access to the treating chamber 16 may be permitted when the door assembly 20 is open. While aspects of the present disclosure are described in terms of a conventional dishwashing unit, it could also be implemented in other types of dishwashing units, such as in-sink dishwashers, multi tub dishwashers, or drawer-type dishwashers.

Dish holders, illustrated in the form of upper and lower dish racks 22, 24, respectively, are located within the treating chamber 16 and receive dishes for washing. The upper and lower racks 22, 24 are typically mounted for slidable movement in and out of the treating chamber 16 for ease of loading and unloading. Other dish holders may be provided, such as a silverware basket. As used in this description, the term "dish(es)" is intended to be generic to any item, single or plural, that may be treated in the dishwasher 10, including, without limitation, dishes, plates, pots, bowls, pans, glassware, and silverware. While not shown, additional dish holders, such as a silverware basket on the interior of the door assembly 20 or a third level rack above the upper rack 22 may also be provided.

A spraying system 28 may be provided for spraying liquid into the treating chamber 16 and is illustrated as having multiple sprayers in the form of an upper sprayer 30, a mid-level sprayer 32, a lower rotatable spray arm 34, and a spray manifold 36. The upper sprayer 30 may be located above the upper rack 22 and is illustrated as a fixed spray nozzle that sprays liquid downwardly within the treating chamber 16. Mid-level rotatable sprayer 32 and lower rotatable spray arm 34 are located, respectively, beneath upper rack 22 and lower rack 24 and are illustrated as rotating spray arms. The mid-level spray arm 32 may provide a liquid spray upwardly through the bottom of the upper rack 22. The lower rotatable spray arm 34 may provide a liquid spray upwardly through the bottom of the lower rack 24. The mid-level rotatable sprayer 32 may optionally also provide a liquid spray downwardly onto the lower rack 24, but for purposes of simplification, this will not be illustrated herein.

The spray manifold 36 may be fixedly mounted to the tub 14 adjacent to the lower rack 24 and may provide a liquid spray laterally through a side of the lower rack 24. The spray manifold 36 may not be limited to this position; rather, the spray manifold 36 may be located in virtually any part of the treating chamber 16. Suitable spray manifolds are set forth in detail in U.S. Pat. No. 7,445,013, issued Nov. 4, 2008, and titled "Multiple Wash Zone Dishwasher," and U.S. Pat. No. 7,523,758, issued Apr. 28, 2009, and titled "Dishwasher Having Rotating Zone Wash Sprayer," both of which are incorporated herein by reference in their entirety.

A recirculation system 38 may be provided for recirculating liquid from the treating chamber 16 to the spraying system 28. The recirculation system 38 may include a sump 40 and a pump assembly 42. The sump 40 collects liquid sprayed in the treating chamber 16 and may be formed by a sloped or recessed portion of a bottom wall of the tub 14. The pump assembly 42 may include both a drain pump 44 and a recirculation pump 46. The drain pump 44 may draw liquid from the sump 40 and pump the liquid out of the dishwasher 10 to a household drain line 48. The recirculation pump 46 may draw liquid from the sump 40, and the liquid may be simultaneously or selectively pumped through a supply tube 50 to each of the spray assemblies 30, 32, 34, 36 for selective spraying. While the pump assembly 42 is illustrated as having separate drain and recirculation pumps 44, 46 in an alternative aspect of the present disclosure, the pump assembly 42 may include a single pump configured to selectively supply wash liquid to either the spraying system 28 or the drain line 48, such as by configuring the single pump to rotate in opposite directions, or by providing a suitable valve system. Though not shown, a liquid supply system may be fluidly coupled with the recirculation system 38, and may include a water supply conduit coupled with a household water supply for supplying water to the treating chamber 16.

A heating system including a heater 52 may be located within or near the sump 40 for heating liquid contained in the sump 40. A filtering system (not shown) may be fluidly coupled with the recirculation flow path for filtering the recirculated liquid.

A dispensing system may be provided for storing and dispensing treating chemistry to the treating chamber 16. As shown herein, the dispensing system can include a dispenser 54 mounted on an inside surface of the door assembly 20 such that the dispenser 54 is disposed in the treating chamber 16 when the door assembly 20 is in the closed position. The dispenser 54 is configured to dispense treating chemistry to the dishes within the treating chamber 16. The dispenser 54 can have one or more compartments 56 closed by a door 58 on the inner surface of the door assembly 20. The dispenser 54 can be a single use dispenser which holds a single dose of treating chemistry, a bulk dispenser which holds a bulk supply of treating chemistry and which is adapted to dispense a dose of treating chemistry from the bulk supply during a cycle of operation, or a combination of both a single use and bulk dispenser. The dispenser 54 can further be configured to hold multiple different treating chemistries. For example, the dispenser 54 can have multiple compartments defining different chambers in which treating chemistries can be held. While shown as being disposed on the door assembly 20, other locations of the dispenser 54 are possible.

A controller 60 may also be included in the dishwasher 10, which may be operably coupled with various controllable components of the dishwasher 10 to implement a cycle of operation. The controller 60 may be located within the door assembly 20 as illustrated, or it may alternatively be located elsewhere within the chassis 12. The controller 60 may also be operably coupled with a control panel or user interface 62 for receiving user-selected inputs and communicating information to the user. The user interface 62 may include operational controls such as dials, lights, switches, and displays enabling a user to input commands, such as a cycle of operation, to the controller 60, and receive information.

The dishwasher 10 may further include a radio system in communication with the controller 60 for the exchange of data between the controller 60 and an external device, such as a home router. The radio system may include multiple antennas for external communication. In many dishwashers, the tub 14 is made from metal. The metal tub 14 is electrically connected to earth ground, and acts as a large Faraday shield which does not allow wireless signals to escape the dishwasher 10. The dishwasher 10 may employ antenna diversity to improve the quality and strength of the wireless signal, and the multiple antennas of the dishwasher 10 may be located relative to the tub 14 such that signals from the antennas are not disrupted by the metal tub 14. Even if the dishwasher 10 is provided with a plastic tub 14, antenna coverage may still prove to be an issue if the dishwasher 10 is provided with a metal front panel or metal console, or if the dishwasher 10 is placed near a metal object, like another appliance.

In the aspect of the present disclosure shown herein, the radio system includes a first antenna 64 and a second antenna 66. The antennas 64, 66 may be spaced from one another and can be directional, such that a complete, substantially spherical coverage pattern is provided, with each antenna 64, 66 providing approximately a hemisphere of coverage. The antennas 64, 66 may need to communicate with a wireless router within the home, and the location of the wireless router with respect to the dishwasher 10 can vary from home to home. Thus, if the wireless router is somewhere within the first hemisphere of coverage provided by the first antenna 64, the first antenna 64 alone may be able to communicate with the wireless router. Likewise, if the wireless router is somewhere within the second hemisphere of coverage provided by the second antenna 66, the second antenna 66 alone may be able to communicate with the wireless router.

The number and location of the antennas can be varied in order to achieve a desired coverage pattern, and may depend on factors such as the materials used to construct the dishwasher 10, and the environment in which the dishwasher will be located. For example, a dishwasher having a plastic tub rather than a metal tub may still experience antenna coverage issues if it is placed next to a metal object, such as another appliance like a refrigerator. In one example, one or both of the antennas 64, 66 can be a PIFA ("planar inverted-F antenna"), a slot antenna, or a PESA ("passive electronically scanned antenna"), although other types of antennas may be usable as well.

The dishwasher 10 comprises at least a first side and a second side, with the first antenna 64 located on the first side and the second antenna 66 located on the second side. The first and second sides can be in an opposing relationship (i.e. can be formed by front and rear sides, or right and left sides), or can be located in an adjacent relationship (i.e. can be formed by a front and right side, a right and rear side, a rear and left side, or a left and front side). The sides can be sides of the dishwasher's housing, but the antennas 64, 66 are not necessarily mounted to the surface or face of the housing. The antennas 64, 66 can be mounted to an exterior or interior surface of the chassis 12, the tub 14, the frame (not shown), or panels mounted to the frame.

Figure 3:
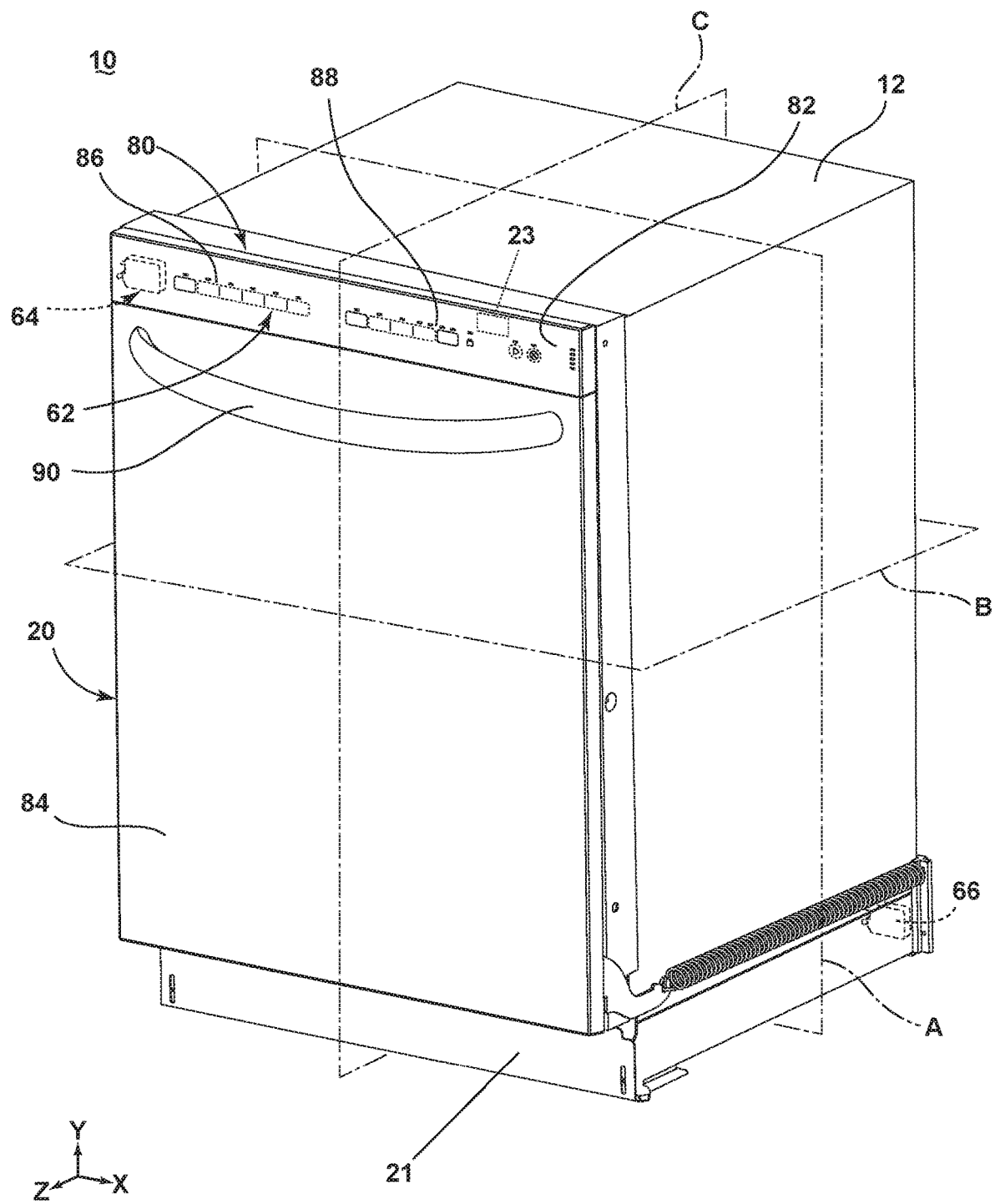
FIG. 3 is a perspective view of a dishwasher according to an aspect of the present disclosure illustrating a control panel on a door of the dishwasher.

In the illustrated aspect of the present disclosure, the first antenna is provided on or located proximate to a front of the dishwasher 10, and is referred to herein as a front antenna 64. The second antenna is provided on or located proximate to a rear of the dishwasher 10, and is referred to herein as a rear antenna 66. The door assembly 20 can define the front of the dishwasher 10, while a rear wall of the tub 14 may define the rear of the dishwasher 10. In the illustrated aspect of the present disclosure, the front antenna 64 is mounted within the door assembly 20, and the rear antenna 66 is mounted below the tub 14 in the rear of the dishwasher 10. Other possible locations for the front antenna 64 include, but are not limited to, the front kick plate 21 of the dishwasher 10 (FIG. 3) and the badge or nameplate 23 which visually displays a logo for the dishwasher 10 (FIG. 3).

The radio system can further include one or more communication modules which operably couples the front and rear antennas 64, 66 to the controller 60. As illustrated, the front and rear antennas 64, 66 are operably coupled with a common communication module, which may include a radio 68, which is in turn operably coupled with the controller 60. The radio 68 provides an interface between the appliance controller 60 and an external network and can comprise a Wi-Fi radio module. The radio 68 includes a first cable 70 connected to the front antenna 64 and a second cable 72 connected to the rear antenna 66. While only one radio 68 is shown herein, each antenna 64, 66 can be coupled with a separate radio. In one example, one or both of the cables 70, 72 can be a coaxial cable, although other types of cables, connections or wiring may be usable as well.

The front antenna 64 can define a first artificial boundary, and the second antenna 66 can define a second artificial boundary, such that the first and second artificial boundaries define a bound area therebetween. The radio 68 can lie within the bound area, which can minimize the length of the cables 70, 72 connecting the antennas to the radio 68. Minimizing cable length reduces cable loss, which is the amount of dissipation of the signal due to resistance and is dependent on cable length. More particularly, as shown in FIG. 1, the radio 68 can lie between the first and second antennas 64, 66. This helps optimize the lengths of the cables 70, 72. In the illustrated aspect of the present disclosure, the radio 68 is mounted in the door assembly 20 along with the first antenna 64, but is spaced from and below the first antenna 64 in order to minimize the distance to the second antenna 66. The radio 68 can also be vertically higher than the second antenna, in order to prevent the cable 70 to the first antenna 64 from needing to be too long. Other possible locations for the radio 68 include, but are not limited to, the front kick plate 21 of the dishwasher 10 (FIG. 3) or beneath the tub 14.

The cables 70, 72 are ideally as short as practically possible in order to reduce cable loss. However, since the antennas 64, 66 are placed on different sides of the dishwasher 10 in order to achieve the desired coverage pattern, the length of the cables 70, 72 needs to be balanced against each other and the amount of acceptable cable loss. In one example, the length of the cables 70, 72 can be less than or equal to 1,500 mm and have an acceptable amount of cable loss. In another example, the length of the cables 70, 72 can be less than or equal to 1,200 mm. In yet another example, the length of the first cable 70 can be approximately 730 mm, with a tolerance of ±26 mm, and the length of the second cable 72 can be approximately 1185 mm, with a tolerance of ±40 mm. Using a higher grade of wire for the cables 70, 72 can also keep cable loss low, but this solution is more expensive. If the two cables 70, 72 are equal in length, both antennas 64, 66 have the same amount of cable loss. However, in practical terms, some difference in length will not affect performance of the antennas 64, 66. In the illustrated aspect of the present disclosure, for example, the radio 68 is closer to the front antenna 64.

Figure 2:
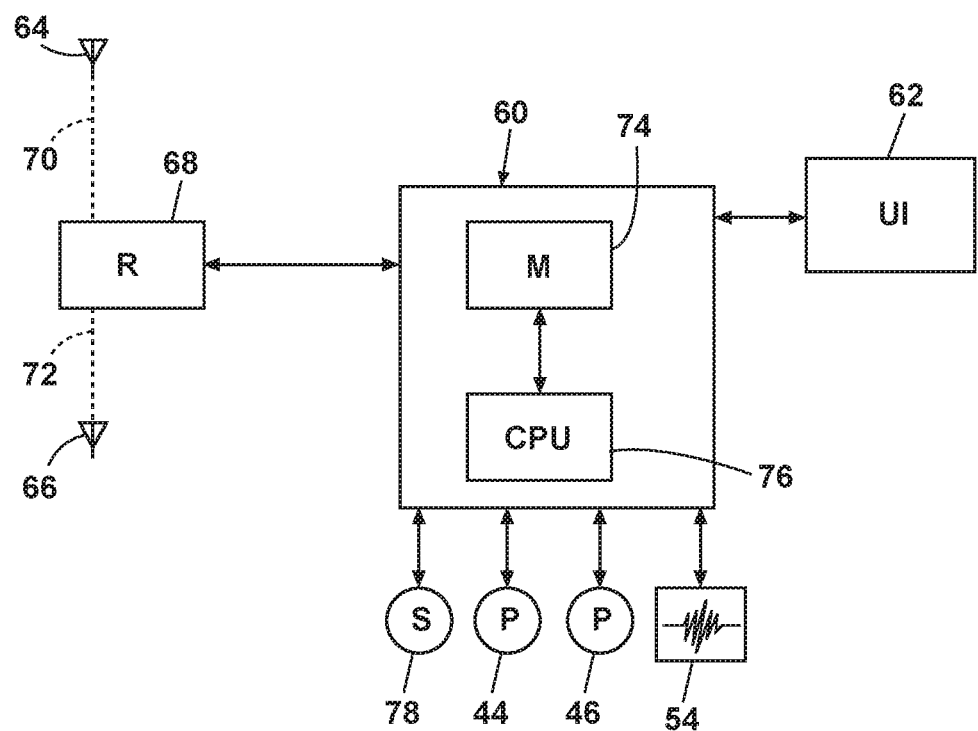
FIG. 2 is a schematic view of a controller of the dishwasher of FIG. 1.

As illustrated schematically in FIG. 2, the controller 60 may be coupled with at least one controllable component configured to implement an automatic cycle of operation, non-limiting examples of which include the heater 52 for heating the wash liquid during a cycle of operation, the drain pump 44 for draining liquid from the treating chamber 16, and the recirculation pump 46 for recirculating the wash liquid during a cycle of operation. The controller 60 may be provided with a memory 74 and a central processing unit (CPU) 76. The memory 74 may be used for storing control software that may be executed by the CPU 76 in completing a cycle of operation using the dishwasher 10 and any additional software. For example, the memory 74 may store one or more pre-programmed cycles of operation that may be selected by a user and completed by the dishwasher 10. The controller 60 may also receive input from one or more sensors 78. Non-limiting examples of sensors that may be communicably coupled with the controller 60 include a temperature sensor and a turbidity sensor to determine the soil load associated with a selected grouping of dishes, such as the dishes associated with a particular area of the treating chamber. The controller 60 may also be coupled with the radio 68 for transmitting and receiving data to and from the antennas 64, 66 via the radio 68.

FIG. 3 is a perspective view of a dishwasher 10 according to an aspect of the present disclosure. The dishwasher 10 can include many of the same elements disclosed for the schematic shown in FIGS. 1-2, and like elements will be referred to with the same reference numerals for both. The dishwasher 10 includes a control console or panel 80 located on the front of the dishwasher 10. The front antenna 64 can be located within the control panel 80.

The control panel 80 can be mounted at an upper end of the door assembly 20 of the dishwasher 10. The control panel 80 can include a face plate 82 mounted above a front panel 84 of the door assembly 20, and the user interface 62 of the dishwasher 10, which can be carried by the face plate 82. The user interface 62 can include operational controls such as tactile switches covered with buttons 86 and a display 88, among other possible configurations can include various combinations of dials, lights, switches, and displays enabling a user to input commands and receive information. The door assembly 20 can also include a handle 90 attached to the front panel 84; as shown herein, the handle 90 is positioned below the control panel 80.

Figure 4:
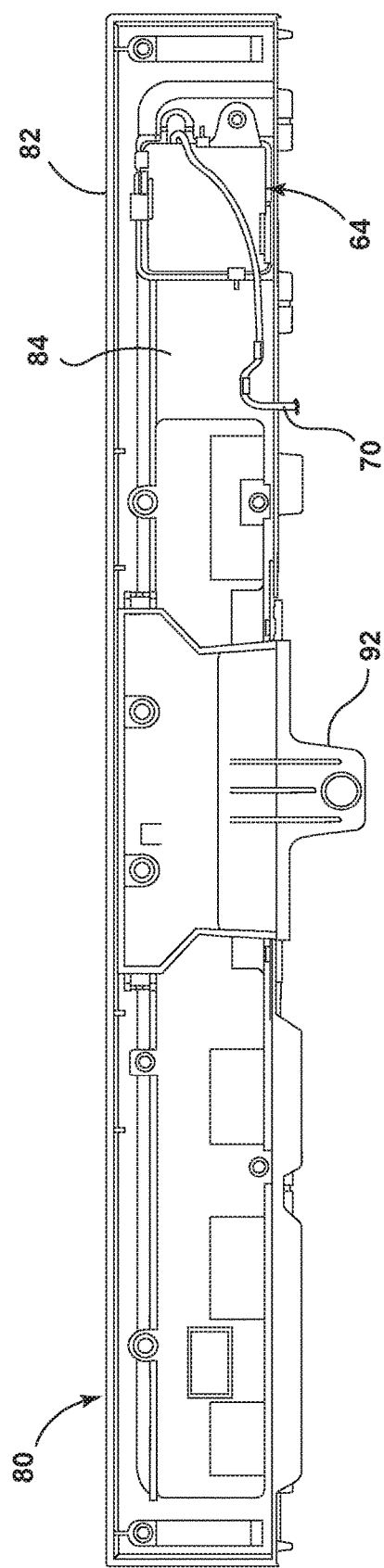
FIG. 4 is a rear view of the control panel of the dishwasher of FIG. 3.

FIG. 4 is a rear view of the control panel 80 of FIG. 3. The front antenna 64 can be located behind the face plate 82 of the control panel 80. As shown herein, the front antenna 64 is located laterally with respect to a user interface bracket 92, which couples the user interface 62 (FIG. 3) to the rear side of the front panel 84.

Figure 5:
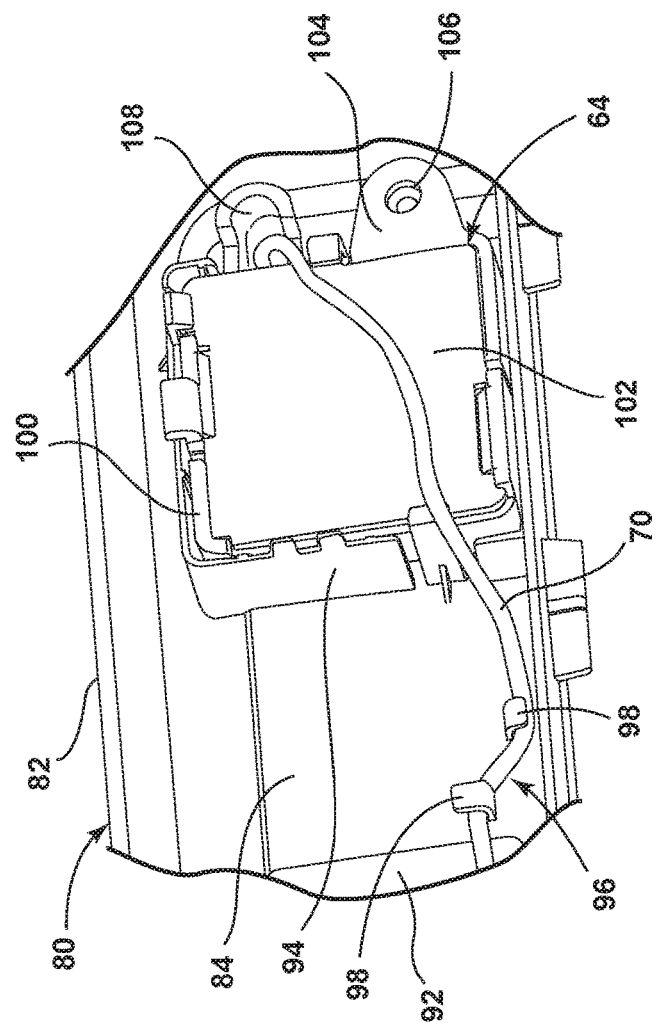
FIG. 5 is a close-up rear view of a portion of the control panel of FIG. 4.

FIG. 5 is a close-up rear view of a portion of the control panel of FIG. 4. An antenna receiver 94 can be formed on the rear side of the face plate 82 for accommodating the front antenna 64, and can include walls, openings, bosses, and the like for operational support of the front antenna 64. The face plate 82 can further be provided with a wire routing feature 96 for routing the cable 70 connected the front antenna 64 and for providing strain relief. The wire routing feature 96 includes a pair of opposing tabs 98 which can accommodate the cable 70 and which reduce the strain on the cable 70.

The front antenna 64 can be contained within a housing, which includes a housing base 100 and a housing cover 102. The housing base 100 includes a mounting flange 104 having a hole 106 which receives a fastener (not shown) for attaching the front antenna 64 to the control panel 80, and a cable outlet 108 providing a pathway for the cable 70 connected to the front antenna 64 to exit the antenna housing. The antenna housing can be made from a plastic material, such as polyvinyl chloride (PVC).

Figure 6:
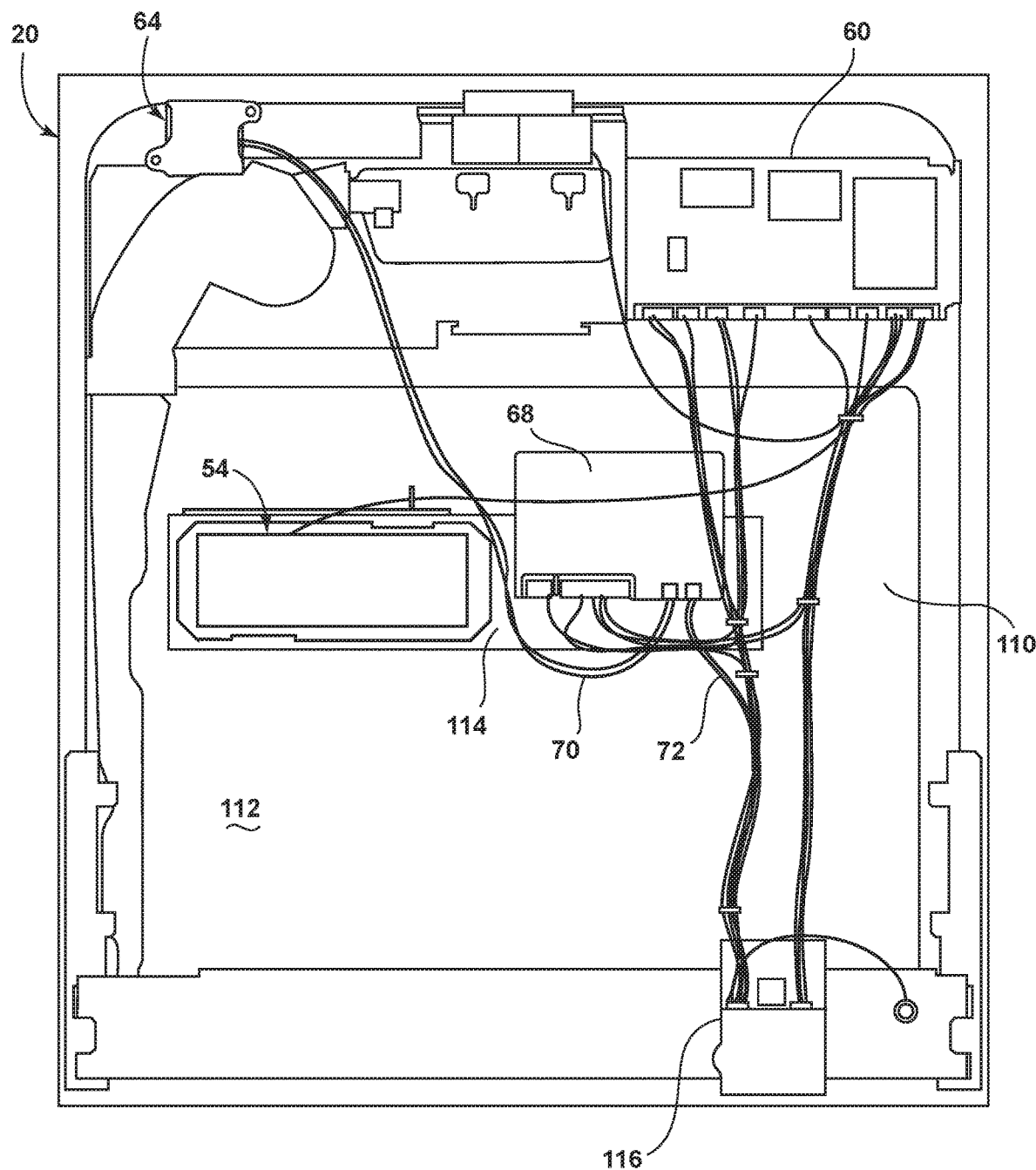
FIG. 6 is a front view of the dishwasher of FIG. 3, with a front panel of the door removed for clarity.
Figure 7:
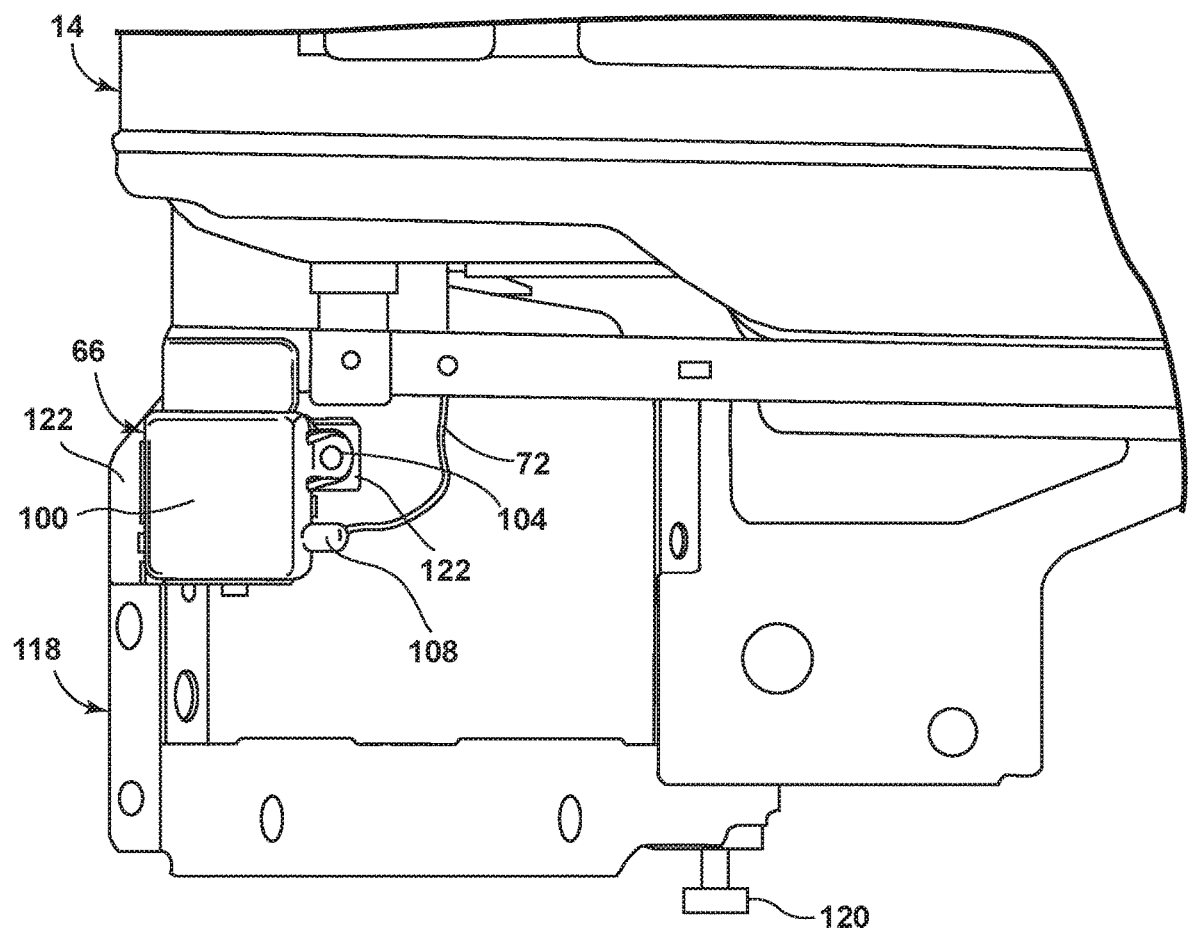
FIG. 7 is a rear view of a portion of the dishwasher of FIG. 3.

FIG. 6 is a front view of the dishwasher of FIG. 3, with the front panel 84 and the control panel 80 of the door assembly 20 removed for clarity. The door assembly 20 includes a rear panel 110 which, together with the front panel 84 and control panel 80 (FIG. 3) defines an interior space 112 in which components of the dishwasher 10 can be accommodated. As shown herein, at least the dispenser 54, the controller 60, the radio 68 and the front antenna 64 can be accommodated within the interior space 112. Furthermore, the first cable 70 coupling the front antenna 64 to the radio 68 can extend through the interior space 112. A common bracket 114 can be provided for mounting the dispenser 54 and the radio 68 to the rear panel 110. A wiring harness 116 can be provided at a lower end of the interior space 112 for passing wiring, including the second cable 72 coupling the radio 68 to the rear antenna 66 (FIG. 7). Another possible location for the front antenna 64 includes providing the front antenna 64 with the radio 68, such as by embedding the front antenna 64 on a printed circuit board of the radio 68.

FIG. 7 is a rear view of a portion of the dishwasher 10 of FIG. 3. The rear antenna 66 can have substantially the same structure as the front antenna 64. The rear antenna 66 can be located on the rear side of the dishwasher, below the tub 14. As shown herein, in one configuration, the rear antenna 66 can be mounted to a frame 118 which supports the tub 14 on a ground surface. The frame 118 can be considered as part of the dishwasher housing, may define a space in which components of the dishwasher, such as a pump, are typically accommodated. The frame 118 can have one or more legs 120 configured to rest on the ground surface. More specifically, a gusset 122 can be attached to the frame 118, and the antenna housing, formed in part by the housing base 100, can be attached to the gusset 122 using a fastener (not shown) received within the hole 106 of the mounting flange 104. The second cable 72 enters the antenna housing via the cable outlet 108. The rear antenna 66 may be exposed, in that it is not covered by a panel of the dishwasher 10.

Referring to FIG. 3, a Cartesian coordinate system can be conceptually applied to the dishwasher 10, with an X-axis extending parallel to the front and rear bottom edges of the dishwasher 10, a Y-axis extending parallel to the right and left sides of the dishwasher 10, and a Z-axis extending parallel to the side bottom edges of the dishwasher 10. The X-axis and other axes parallel thereto define an "X-direction", the Y-axis and other axes parallel thereto define a "Y-direction", and the Z-axis and other axes parallel thereto define a "Z-direction". The dishwasher 10 has three principle planes; an azimuth plane A defined by a plane extending between the X-axis and the Y-axis, an elevation plane B defined by a plane extending between the X-axis and the Z-axis, and a secondary elevation plane C defined by a plane extending between the Y-axis and the Z-axis.

A dishwasher having front and rear antennas was performance tested, and antenna scans were performed in the three principle planes of the appliance: the azimuth plane, the elevation plane, and the secondary elevation plane. During testing, the front antenna 64 and the rear antenna 66 were positioned in the locations shown in FIGS. 3-7. It was found that the antennas 64, 66 provide a substantially spherical coverage pattern for the dishwasher, with each antenna 64, 66 providing approximately a hemisphere of coverage, with substantially no blind spots in any of the three principle planes of the dishwasher.

Figure 8:
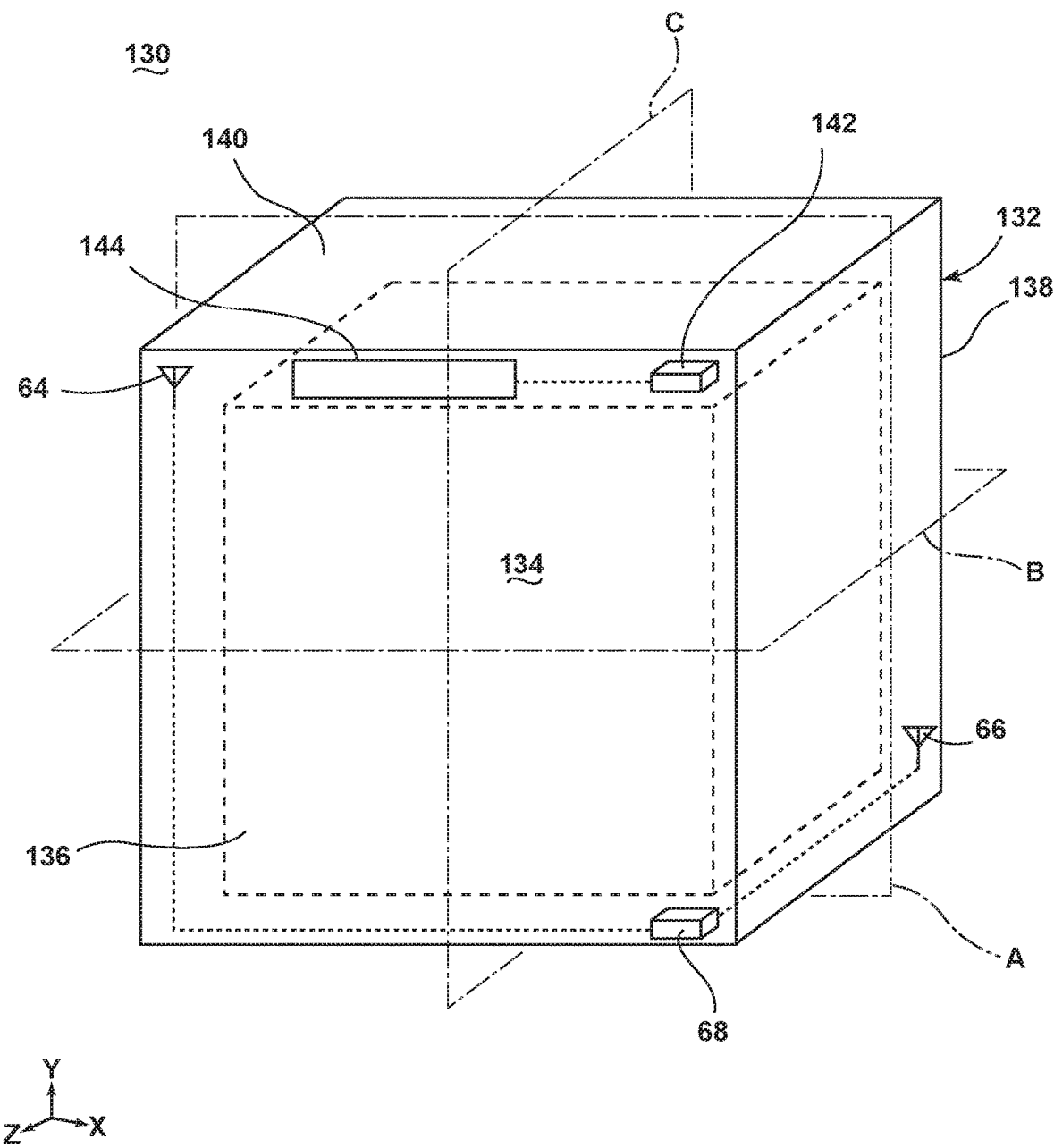
FIG. 8 is a schematic illustration of a generic household appliance according to an aspect of the present disclosure.

While the aspects described above relate to a dishwasher, it is also contemplated that the concept can be applied to any type of household appliance having a housing primarily constructed from metal. FIG. 8 is a schematic illustration of a generic household appliance 130 according to an aspect of the present disclosure. The appliance 130 has a housing 132 primarily constructed from metal and that defines an interior of the appliance 130. A treating chamber 134 may be mounted to the housing 132 and provided at least partially within the interior. The treating chamber 134 can have an access opening and a door (not shown) may selectively open and close the access opening. Thus, the door provides accessibility to the treating chamber 134 for the loading and unloading of items. The housing 132 further has a front face 136, a rear face 138, and a top face. The household appliance 130 illustrated in FIG. 8 may include a refrigerator, a washing machine, or a clothes dryer. In the case of a refrigerator, a front-loading washing machine, and a front-loading clothes dryer, the door may be provided on the front face 136 of the housing 132. In the case of a top-loading washing machine or clothes dryer, the door may be provided on the top face 140.

The appliance 130 may receive one or more item(s), and may treat the item(s) according to a useful cycle of operation. For example, in the case of a refrigerator, the treating chamber 134 can receive one or more food item(s), and the refrigerator can perform a cooling cycle on the food item(s) in the treating chamber 134. In the case of a washing machine, the treating chamber 134 can receive one or more clothing item(s), and the washing machine can perform a washing cycle on the clothing item(s) in the treating chamber 134. In the case of a clothes dryer, the treating chamber 134 can receive one or more clothing item(s), and the clothes dryer can perform a drying cycle on the clothing item(s) in the treating chamber 134. Other examples of appliances 130 typically found within a home and which may be used with the present disclosure include a freezer, a range, a stove, and a cooktop.

A controller 142 may also be provided on the housing 132, which may be operably coupled with various controllable components of the appliance 130 to implement a cycle of operation. The controller 142 may also be operably coupled with a control panel or user interface 144 for receiving user-selected inputs and communicating information to the user. The user interface 144 may include operational controls such as dials, lights, switches, and displays enabling a user to input commands, such as a cycle of operation, to the controller 142 and receive information.

The appliance 130 may further include a radio system in communication with the controller 142 for the exchange of data between the controller 142 and an external device, such as a home router. The radio system may be substantially similar to the radio system disclosed above, and may include multiple antennas for external communication, including the first and second antennas 64, 66, radio 68, and cables 70, 72 described above. The antennas 64, 66 can have a substantially similar structural package to that shown in FIGS. 5 and 7.

Like the dishwasher described above, the metal housing 132 of the household appliance 130 is electrically connected to earth ground, and acts as a large Faraday shield which does not allow wireless signals to escape the appliance 130. The appliance 130 may employ antenna diversity to improve the quality and strength of the wireless signal, and the multiple antennas of the appliance 130 may be located such that signals from the antennas are not disrupted by the metal housing 132. Even if the appliance 130 is provided with a partially plastic housing 132, antenna coverage may still prove to be an issue if the appliance 130 is provided with a metal front panel or metal console, or if the appliance 130 is placed near a metal object, like another appliance.

The number and location of the antennas can be varied in order to achieve a desired coverage pattern, and may depend on factors such as the materials used to construct the appliance 130, and the environment in which the appliance 130 will be located. For example, in the case of a refrigerator, the first antenna 64 can be located on the housing 132 behind a grill or kick plate provided on the front face 136 of the housing 132, below the refrigerator door, and the second antenna 66 can be located at a lower portion of the rear face 138 housing 132. In the case of a washing machine, the first antenna 64 can be located at the front of the housing 132, behind a console for a user interface provided on the front face 136 of the housing 132, and the second antenna 66 can be located at the rear of the housing 132, such as on the rear face 138 of the housing 132. In the case of a clothes dryer, the first antenna 64 can be located at the front of the housing 132, behind a console for a user interface provided on the front face 136 of the housing 132, and the second antenna 66 can be located at the rear of the housing 132, such as on a rear face 138 of the housing 132.

A Cartesian coordinate system can be conceptually applied to the appliance 130, with an X-axis extending parallel to the front and rear bottom edges of the appliance 130, a Y-axis extending parallel to the right and left sides of the appliance 130, and a Z-axis extending parallel to the side bottom edges of the appliance 130. The X-axis and other axes parallel thereto define an "X-direction", the Y-axis and other axes parallel thereto define a "Y-direction", and the Z-axis and other axes parallel thereto define a "Z-direction". The appliance 130 has three principle planes; an azimuth plane A defined by a plane extending between the X-axis and the Y-axis, an elevation plane B defined by a plane extending between the X-axis and the Z-axis, and a secondary elevation plane C defined by a plane extending between the Y-axis and the Z-axis.

A refrigerator having front and rear antennas was performance tested, and antenna scans were performed in the three principle planes of the appliance: the azimuth plane, the elevation plane, and the secondary elevation plane. During testing, one antenna was positioned behind a kick plate provided at the front of the refrigerator housing, below the refrigerator door, and another antenna was positioned at a lower portion of the rear surface of the refrigerator housing. It was found that the antennas provide a substantially spherical coverage pattern for the refrigerator, with each antenna providing approximately a hemisphere of coverage, with substantially no blind spots in any of the three principle planes of the refrigerator.

A washing machine having front and rear antennas was performance tested, and antenna scans were performed in the three principle planes of the appliance: the azimuth plane, the elevation plane, and the secondary elevation plane. During testing, one antenna was positioned behind a console for a user interface provided on the front face of the washer housing, and another antenna was positioned at an upper portion of the rear surface of the washer housing. It was found that the antennas provide a substantially spherical coverage pattern for the washing machine, with each antenna providing approximately a hemisphere of coverage, with substantially no blind spots in any of the three principle planes of the washing machine.

A clothes dryer having front and rear antennas was performance tested, and antenna scans were performed in the three principle planes of the appliance: the azimuth plane, the elevation plane, and the secondary elevation plane. During testing, one antenna was positioned behind a console for a user interface provided on the front face of the dryer housing, and another antenna was positioned at an upper portion of the rear surface of the dryer housing. An alternative location for the rear antenna was also tested, with the rear antenna positioned at a lower portion of the rear surface of the dryer housing. It was found that the antennas in either location provide a substantially spherical coverage pattern for the clothes dryer, with each antenna providing approximately a hemisphere of coverage, with substantially no blind spots in any of the three principle planes of the clothes dryer.

The apparatus disclosed above provides a household appliance with multiple antennas, allowing the controller of the appliance to communicate with an external device. One advantage that may be realized in the practice of some aspects of the present disclosure of the described systems and methods is that, even with a metal tub, the appliance has a complete antenna coverage pattern, such that the appliance can communicate with an external device, regardless of the location of the external device with respect to the appliance. Another advantage that may be realized in the practice of some aspects of the present disclosure of the described systems and methods is that cable loss is minimized by placing the radio for the appliance antennas with a bound area defined by the antennas.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:
1. A dishwasher, comprising:
 a housing having a front and a rear;
 a tub located within the housing and at least partially defining a treating chamber configured for receiving items for treatment according to at least one automatic cycle of operation;
 at least one controllable component configured to implement the at least one automatic cycle of operation;
 a controller coupled to the at least one controllable component and configured to control the at least one controllable component according to the at least one automatic cycle of operation; and
 a radio system in communication with the controller and configured for transmitting and receiving data and having a set of antennas configured for providing collective coverage for external communication and wherein at least one of the set of antennas is located proximate a lower portion of the housing.
2. The dishwasher of claim 1 wherein the at least one of the set of antennas is located below the tub.

3. The dishwasher of claim 2 wherein the at least one of the set of antennas is located below the tub and at the rear of the housing.

4. The dishwasher of claim 3 wherein the radio system comprises a radio in the form of a printed circuit board, and the at least one of the set of antennas is embedded on the printed circuit board of the radio.

5. The dishwasher of claim 3 wherein an other antenna of the set of antennas is located proximate the front of the housing.

6. The dishwasher of claim 5 wherein the other antenna of the set of antennas is located at a higher elevation relative the at least one of the set of antennas.

7. The dishwasher of claim 5, further comprising at least one of: a kick plate on the front of the housing or a nameplate which visually displays a logo for the dishwasher and wherein the at least one of the set of antennas is located proximate at least one of the kick plate or the nameplate.

8. The dishwasher of claim 1 wherein the housing comprises at least a first side and a second side, with the at least one of the set of antennas is located on the first side and a second antenna of the set of antennas is located on the second side.

9. The dishwasher of claim 8 wherein the first and second sides are in an opposing relationship.

10. The dishwasher of claim 9 wherein the first side comprises a left front side of the dishwasher and the second side comprises a right front side of the dishwasher.

11. The dishwasher of claim 10 wherein the at least one of the set of antennas is located at a left front side bottom portion of the dishwasher and the second antenna of the set of antennas is located at a right front side bottom portion of the dishwasher.

12. The dishwasher of claim 11 wherein the at least one of the set of antennas is mounted to the housing, the tub, a chassis, a frame, or a panel thereof.

13. The dishwasher of claim 8 wherein the at least one of the set of antennas and the second antenna of the set of antennas are both located below the treating chamber.

14. The dishwasher of claim 8 wherein the at least one of the set of antennas has a first radiation pattern and the second antenna of the set of antennas has a second radiation pattern, wherein the first radiation pattern and the second radiation patterns collectively form a combined radiation pattern.

15. The dishwasher of claim 14 wherein the housing further comprises a door defining the front of the dishwasher.

16. The dishwasher of claim 1 wherein the radio system includes a radio located beneath the tub.

17. The dishwasher of claim 1 wherein the radio system includes a radio provided with the at least one of the set of antennas.

18. The dishwasher of claim 17 wherein the radio comprises a printed circuit board, and the at least one of the set of antennas is embedded on the printed circuit board of the radio.

19. The dishwasher of claim 1 wherein the housing further comprises a frame which supports the tub on a ground surface and wherein the at least one of the set of antennas is mounted to the frame.

20. The dishwasher of claim 1 wherein the at least one of the set of antennas and another of the set of antennas lie on opposite sides of a plane vertically through and bisecting the housing.

* * * * *